United States Patent [19]

Sekiguchi et al.

[11] Patent Number: 4,758,624
[45] Date of Patent: Jul. 19, 1988

[54] SILANE-CROSSLINKABLE HALOGENATED POLYMER COMPOSITION AND PROCESS OF CROSSLINKING THE SAME

[75] Inventors: Isamu Sekiguchi, Funabashi; Hideo Sunazuka, Kamagaya; Hirotada Kobayashi, Sakura; Yasusada Sekiguchi, Tokyo, all of Japan

[73] Assignee: Fujikura Ltd., Tokyo, Japan

[21] Appl. No.: 39,783

[22] Filed: Apr. 20, 1987

Related U.S. Application Data

[63] Continuation of Ser. No. 762,282, Aug. 5, 1985, abandoned.

[30] Foreign Application Priority Data

Jun. 8, 1984 [JP] Japan ............................ 59-164566
Aug. 6, 1984 [JP] Japan ............................ 59-164565

[51] Int. Cl.$^4$ ...................... C08L 11/00; C08L 23/28
[52] U.S. Cl. ................................ 525/101; 525/102; 525/104; 525/105; 525/106; 525/187; 525/235; 525/403
[58] Field of Search .............. 525/101, 102, 104, 405, 525/187, 403

[56] References Cited

U.S. PATENT DOCUMENTS

4,463,129  7/1984  Shinada et al. ................ 525/102
4,493,924  1/1985  Rifi ................................. 525/102

FOREIGN PATENT DOCUMENTS

0167739  12/1981  Japan ................................ 525/102
0008203  1/1982  Japan ................................ 525/102
0096048  6/1982  Japan ................................ 525/102
0167334  10/1982  Japan ................................ 525/102

*Primary Examiner*—Wilbert J. Briggs, Sr.
*Attorney, Agent, or Firm*—Oblon, Fisher, Spivak, McClelland & Maier

[57] ABSTRACT

Silane-crosslinkable halogenated polymer composition and process of crosslinking the same.

The silane-crosslinkable halogenated polymer composition contains a mixture including: 100 parts by weight of a halogenated polymer and about 0.1-20 parts by weight of an amino group-containing organic silane compound. The halogenated polymer composition silane-crosslinked is useful for the sheath and insulation of electric wires and cables and other moldings such as a hose.

6 Claims, No Drawings

SILANE-CROSSLINKABLE HALOGENATED POLYMER COMPOSITION AND PROCESS OF CROSSLINKING THE SAME

This application is a continuation of application Ser. No. 762,282, filed on Aug. 5, 1985, now abandoned.

The present invention relates to a silane-crosslinkable halogenated polymer composition and process of crosslinking this composition.

Heretofore, various crosslinked structures formed by crosslinking halogenated polymer composition with silane coupling agents have been proposed. For example, there are known a process in which a halogenated rubber is crosslinked with a vinylsilane and dicumyl peroxide (DCP), a process in which a halogenated rubber is crosslinked with a mercaptosilane, and a process in which a halogenated rubber is crosslinked with a primary aminosilane.

In crosslinking with DCP, a high temperature treatment (higher than 100° C.) is necessary, and in view of the high temperature treatment equipment and the heat control cost, this prior art process is not practically useful. In the case of crosslinking with a mercaptosilane, it is necessary to use a diamine compound or amine salt compound in combination with the mercaptosilane since the mercaptosilane reacts with a halogenated rubber. The reaction is hardly advanced at normal temperatures and the crossing speed is low, resulting in reduction of the productivity. When a primary aminosilane is used, an acceptably crosslinked product is obtained, but the rising of the crosslinking reaction is especially sharp in spite of the fact that the entire reaction speed is relatively low. Thus, if the primary aminosilane is once mixed with the halogenated rubber, the pot life of the composition is very short and scorching (early crosslinking) is liable to occur at the extrusion step.

The present invention is to reduce the above-described drawbacks of the conventional processes.

According to one aspect of the present invention there is provided a silane-crosslinkable halogenated polymer composition comprising a mixture including: 100 parts by weight of a halogenated polymer and about 0.1–20 parts by weight of an amino group-containing organic silane compound.

Another aspect of the present invention is directed to a process of crosslinking the silane-crosslinkable halogenated polymer composition, comprising the step of bringing the composition into contact with water for carrying out the crosslinking.

The silane-crosslinked halogenated polymer composition according to the present invention is useful for the sheath and the insulation of electric wires, cables and other moldings such as a hose.

The halogenated polymer according to the present invention includes any of halogen-containing rubbers and plastics, for example, polychloroprene (Neoprene W) having an ordinary molecular weight, chlorosulfonated polyethylene, and epichlorohydrin rubber and halogenated butyl rubber.

In the present invention, the amino group-containing organic silane compound is used in an amount of about 0.1 to about 20 parts by weight per 100 parts by weight of the halogenated polymer. If the amount of the organic silane compound is smaller than about 0.1 parts by weight, the mechanical strength of the crosslinked product is insufficient because of a low crosslinking density, and a practically satisfactory rubber elastomer can hardly be obtained. If the amount of the organic silane compound exceeds about 20 parts by weight, the crosslinking density is too high and hence the elongation of the crosslinked product is insufficient and is not practically acceptable. In addition, the manufacturing cost is increased.

According to the present invention, ordinary additives such as a filler, an antioxidant, a lubricant and a colorant may be optionally added to the silane-crosslinkable halogenated polymer composition.

In the present invention, the halogenated polymer composition may include about 5 to about 80 parts by weight of a polychloroprene having a low molecular weight as a softener per 100 parts by weight of the halogenated polymer.

Since the low-molecular-weight polychloroprene is liquefied at the processing step by the processing heat, the flowability of the base polymer is increased and the processability of the entire resin composition is improved. Furthermore, as the low-molecular-weight polychloroprene drops in temperature after molding, it is solidified and a crosslinked product is formed. Thus, the crosslinked product has a good shape-retaining property and the produce is hardly deformed, and reduction of the mechanical strength is very low.

By the term "polychloroprene having a low molecular weight" is meant a polychloroprene having a viscosity of about 800,000 to about 1,200,000 cps as measured at 50° C. As commercially available products, there can be mentioned, for example, polychloroprenes sold by Du Pont, U.S.A., under tradenames "Neoprene FB" and "Neoprene FC". The low-molecular-weight polycloroprene is solid at room temperature and becomes liquid at a temperature higher than 50° C. If the low-molecular-weight polychloroprene is added as a softener to the silane-crosslinkable halogenated polymer composition, the polychloroprene is liquefied at the processing step by the processing heat generated by kneading or extrusion, and therefore, the composition is softened and processing becomes easy. Moreover, since the polychloroprene becomes solid if the temperature thereof drops after molding, the molded article is not deformed and has a good shape-retaining property.

If the amount of the polychloroprene is smaller than about 5 parts by weight, the effect of improving the processability is not attained and the shape-retaining property is degraded. Beyond the upper limit of about 80 parts by weight, the mechanical strength of the crosslinked product is degraded and hence practical problems arise.

This crosslinkable composition having the polychloroprene is crosslinked by contact with water in the presence or absence of a silanol catalyst after processing such as pressing, extrusion or injection. This crosslinking is carried out under normal temperature and atmospheric pressure conditions.

In the present invention, the amino group-containing organic silane compound may be represented by the following formula:

wherein R is hydrogen, an alkyl or a phenyl group, R' is an alkylene group, R" is an alkoxy or alkoxyalkoxy group having 1 to 6 carbon atoms.

As this aminosilane coupling agent, there can be mentioned, for example, N-phenylaminopropyltrimethoxysilane, N-phenylaminopropyltriethoxysilane, N- methylaminopropyltrimethoxysilane, N-ethylaminopropyltriethoxysilane, γ-aminopropyltriethoxysilane and γ-aminopropyltrimethoxysilane. The aminosilane coupling agent having the specified secondary amine structure is higher in entire reaction speed than any primary aminosilane coupling agent and is not excessively high in the rising speed of crosslinking as compared to the primary aminosilane coupling agents. This causes advantages in that after mixing of the secondary silane amino coupling agent with a halogenated rubber, a pot life of about 0.5 to about 1 day produces no problem when the composition is actually used, and in that scorching (early crosslinking) hardly occurs.

In order to promote crosslinking reaction, it is preferred that silanol catalyst be added. However, in the present invention, the crosslinking reaction may be carried out in the absence of the silanol catalyst since the halogenated polymer is rendered crosslinkable by addition of the aminosilane coupling agent. The intended effect can be attained by adding the silanol catalyst in an amount of up to about 5 parts by weight per 100 parts by weight of the halogenated polymer or rubber. Addition of the silanol catalyst in an amount larger than about 5 parts by weight is economically disadvantageous and often causes scorching.

In the actual crosslinking reaction, a mixture of the halogenated rubber and the aminosilane coupling agent (the silanol catalyst is added according to need) is previously formed at a temperature lower than 100° C. and then is extrusion-molded at a temperature lower than 100° C. Then, the molded article is crosslinked by standing in the atmosphere at ordinary temperatures or by immersion in warm water.

EXAMPLES 1 TO 3 AND COMPARATIVE EXAMPLES 1 AND 2

Crosslinkable halogenated polymer compositions were separetely prepared in compositions shown in Table 1 according to the following procedures. For each example components indicated in Table 1 were mixed by a roll mixer having a roll temperature of 30° C. for 20 min. Then, each mixture was subjected to press molding at 80° C. for 5 min. to form into a sheet 1 mm thick and thereafter samples were prepared from the sheets for subsequent tests.

TABLE 1

| | parts by weight | | | | |
|---|---|---|---|---|---|
| | Example | | | Comparative Example | |
| | 1 | 2 | 3 | 1 | 2 |
| Halogenated polymer*1 | 100 | 100 | 100 | 100 | 100 |
| Carbon black (HAF) | 50 | 50 | 50 | 50 | 50 |
| Light calcium carbonate*2 | 50 | 50 | 50 | 50 | 50 |
| Neoprene FB*3 | 30 | 30 | 30 | 30 | 30 |
| Paraffin | 2 | 2 | 2 | 2 | 2 |
| N—phenylaminopropyltrimethoxysilane | 0.1 | 10 | 20 | 0 | 30 |

*1Polychloroprene (W type, Mooney viscosity = about 48) produced by Denki Kagaku Kogyo Co., Ltd., Japan, under tradename "Denka chloroprene M-40".
*2Surface treated with fatty acid.
*3Low molcular weight polychloroprene with 800,000–1,200,00 cps. viscosity at 50° C. produced by Du Pont, U.S.A.

The samples were allowed to stand at room temperature for period of time indicated in Table 2 and mechanical properties, i.e., tensile strength and elongation were determined in accordance with IEC standard Pub. 540 (1982). The results are given in Table 2.

TABLE 2

| | Period (days) | Example | | | Comparative Example | |
|---|---|---|---|---|---|---|
| | | 1 | 2 | 3 | 1 | 2 |
| Tensile strength (Kg/mm$^2$) | 3 | 0.05 | 1.45 | 1.58 | 0.03 | 1.64 |
| | 15 | 0.16 | 1.53 | 1.66 | 0.03 | 1.75 |
| | 30 | 0.18 | 1.66 | 1.74 | 0.03 | 1.78 |
| | 60 | 0.20 | 1.69 | 1.76 | 0.03 | 1.81 |
| Elongation (%) | 3 | 1210 | 676 | 408 | 1600 | 250 |
| | 15 | 860 | 463 | 320 | 1550 | 205 |
| | 30 | 652 | 288 | 184 | 1570 | 135 |
| | 60 | 720 | 210 | 89 | 1570 | 55 |

From Table 2 it is apparent that with less than about 0.1 parts by weight of N-phenylaminopropyltrimethoxysilane, a haloganated polymer composition is rather inferior in tensile strength, and that with more than 20 parts by weight of N-phenylaminopropyltrimethoxysilane, a halogenated polymer composition is rather degraded in elongation and not useful.

EXAMPLES 4–9

Silane coupling agents specified in Table 3 were added to the same halogenated polymer, i.e., the polychloroprene produced by Denki Kagaku Kogyo Co., Ltd, as used in Examples 1–3 in an amount of 5 parts by weight per 100 parts by weight of the halogenated polymer and were separately mixed in the same manner as in the preceding examples. Samples thus prepared were allowed to stand in room temparature for period of time specified and then cross linking density was determined by toluene gel fraction (%), which was measured by determining residual weight after immersion of samples in 120° C. toluene for 48 hrs. The results are given in Table 3.

TABLE 3

| | Toluene gel fraction (%) EXAMPLE | | | | | |
|---|---|---|---|---|---|---|
| | 4 | 5 | 6 | 7 | 8 | 9 |
| Silane coupling agent | A | B | C | D | E | F |
| Just after mixing | 13.0 | 7.9 | 5.4 | 2.5 | 0.2 | 0.3 |
| After one day | 35.2 | 36.4 | 26.1 | 10.5 | 0.3 | 0.4 |
| 14 days | 78.8 | 80.5 | 90.9 | 61.0 | 78.6 | 52.5 |
| 30 days | 81.2 | 80.5 | 92.2 | 75.5 | 92.2 | 82.5 |

A: γ-aminopropyltriethoxysilane
B: γ-aminopropyltrimethoxysilane
C: N—methylaminopropyltrimethoxysilane
D: N—ethylaminopropyltriethoxysilane
E: N—phenylaminopropyltrimethoxysilane
F: N—phenylaminopropyltriethoxysilane It was noted that although all the silane coupling agents crosslinked the polychlorolprene rubber, the coupling agents C and E were preferable since samples using these coupling agents were superior in crosslinking density. Further, it was noted that when the coupling agent E was used, the mixture could be stored for relatively long period of time after mixing thereof. It is apparent from the results that when the coupling agent E is used, scorching is less liable to occur at the subsequent extrusion step.

EXAMPLES 10–12 AND COMPARATIVE EXAMPLES 3–5

Mixtures were prepared in compositions shown in Table 4 in the same manner as in the preceding examples. Samples were prepared and subjected to mechanical strength tests in the same manner as in Examples 1–3. The results are set forth in Table 5.

It is apparent from Table 5 that a halogenated polymer compositions containing less than about 5 parts by weight is inferior in elongation, and that a composition containing more than about 80 parts by weight is inferior in tensile strength. It was noted that the light process oil provided rather smaller tensile strength to the composition than Neoprene FB.

TABLE 4

| | parts by weight | | | | | |
|---|---|---|---|---|---|---|
| | Example | | | Comparative Example | | |
| | 10 | 11 | 12 | 3 | 4 | 5 |
| Halogenated polymer*1 | 100 | 100 | 100 | 100 | 100 | 100 |
| Carbon black (HAF) | 50 | 50 | 50 | 50 | 50 | 50 |
| Light calcium carbonate*2 | 50 | 50 | 50 | 50 | 50 | 50 |
| Paraffin | 2 | 2 | 2 | 2 | 2 | 2 |
| N—phenylaminopropyl-trimethoxysilane | 5 | 5 | 5 | 5 | 5 | 5 |
| Neoprene FB*3 | 5 | 40 | 80 | — | 100 | — |
| Light process oil*4 | — | — | — | — | — | 40 |

*1Polychloroprene (W type, Mooney viscosity = about 48) produced by Denki Kagaku Kogyo Co., Ltd., Japan, under tradename "Denka chloroprene M-40".
*2Surface treated with fatty acid.
*3Low molecular weight polychloroprene with 800,000–1,200,00 cps. viscosity at 50° C., produced by Du Pont, U.S.A.
*4Naphthenic process oil with aniline point 62.6° C.

TABLE 5

| | Period (days) | Example | | | Comparative Example | | |
|---|---|---|---|---|---|---|---|
| | | 10 | 11 | 12 | 3 | 4 | 5 |
| Tensile strength (Kg/mm²) | 3 | 1.2 | 0.9 | 0.5 | 1.4 | 0.2 | 0.3 |
| | 15 | 1.5 | 1.2 | 0.8 | 1.7 | 0.4 | 0.5 |
| | 30 | 1.7 | 1.4 | 0.9 | 1.9 | 0.6 | 0.7 |
| Elongation (%) | 3 | 580 | 920 | 1080 | 400 | 1250 | 950 |
| | 15 | 310 | 610 | 710 | 240 | 1010 | 700 |
| | 30 | 100 | 480 | 580 | 60 | 820 | 510 |

EXAMPLES 13–16

N-phenylaminopropyltrimethoxysilane was add to specified halogenated polymers in compositions given in Table 6 and were separately mixed in the same manner as in preceding examples. The crosslinking density of samples thus prepared were determined in the same manner as in Examples 4–9. The results are given in Table 7. It was noted that crosslinking proceeded in ordinary temperature and atmospheric conditions as in Examples 4–9.

TABLE 6

| | Parts by weight EXAMPLE | | | |
|---|---|---|---|---|
| | 13 | 14 | 15 | 16 |
| Halogenated polyer A | 100 | — | — | — |
| Halogenated polyer B | — | 100 | — | — |
| Halogenated polyer C | — | — | 100 | — |
| Halogenated polyer D | — | — | — | 100 |
| N—phenylaminopropyl-trimethoxysilane | 5 | 5 | 5 | 5 |

Halogenated polyer A: a polychloroprene (W type, Mooney viscosity = about 48) sold by Denki Kagaku Kogyo Co., Ltd., Japan, under tradename "Denka chloroprene M-40",
Halogenated polyer B: a chlorosulfonated polyethylene sold by Du Pont, U.S.A, under tradename "Hypalon 40",
Halogenated polyer C: an epichlorohydrin rubber sold by The Japanese Geon Co., Ltd. under tradename "Gechron 3100",
Halogenated polyer D: a halogenated butyl rubber sold by Esso Chemicals, U.S.A., under tradename "Chlorobutyl 1066"

TABLE 7

| | Toluene gel fraction (%) EXAMPLE | | | |
|---|---|---|---|---|
| | 13 | 14 | 15 | 16 |
| Just after mixing | 0.2 | 0.3 | 0.3 | 0.2 |
| After 30 days | 92.2 | 93.0 | 90.0 | 85.5 |

What is claimed is:

1. A silane-crosslinking halogenated polymer composition comprising a mixture including: 100 parts by weight of a halogenated polymer, about 0.1–20 parts by weight of an amino group-containing organic silane compound, and about 5 to about 80 parts by weight of polychloroprene having a viscosity of about 800,000 to about 1,200,000 cps as measured at 50° C.

2. A silane-crosslinkable halogenated polymer composition as recited in claim 1, wherein said amino group-containing organic silane compound is represented by the formula:

RHNR'Si(OR")₃ 

wherein R is hydrogen, an alkyl or a phenyl group, R' is an alkylene group, R" is an alkoxy or alkoxyalkoxy group having 1 to 6 carbon atoms.

3. A silane-crosslinkable halogenated polymer composition as recited in claim 2, wherein said halogenated polymer is selected from the group consisting of polychloroprene, chlorosulfonated polyethylene, an epichlorohydrin rubber and a halogenated butyl rubber.

4. A silane-crosslinkable halogenated polymer composition as recited in claim 1, wherein said amino group-containing organic silane compound is selected from the group consisting of γ-aminopropyltriethoxysilane, γ-aminopropyltrimethoxysilane, N-methylaminopropyltrimethoxysilane, N-phenylaminopropyltrimethoxysilane, N-phenylaminopropyltriethoxysilane and N-ethylaminopropyltriethoxysilane.

5. A process of crosslinking the silane-crosslinkable halogenated polymer composition as recited in claim 1, comprising the step of brining the composition into contact with water to carry out the crosslinking.

6. A process of crosslinking the silane-crosslinkable halogenated polymer composition as recited in claim 5, wherein the silane-crosslinkable halogenated polymer composition further comprises a silanol catalyst.

* * * * *

UNITED STATES PATENT AND TRADEMARK OFFICE
CERTIFICATE OF CORRECTION

PATENT NO. : 4,758,624

DATED : Jul. 19, 1988

INVENTOR(S) : Isamu SEKIGUCHI, et al.

It is certified that error appears in the above-identified patent and that said Letters Patent is hereby corrected as shown below:

ON THE TITLE PAGE:
The first listing under [30] Foreign Application Priority Data should read as follows:

-- Aug. 6, 1984 [JP]  Japan.................. 59-164566 --

Signed and Sealed this

Fourteenth Day of February, 1989

Attest:

DONALD J. QUIGG

Attesting Officer

Commissioner of Patents and Trademarks